3,024,219
POLYMERIZATION OF TERMINAL EPOXYALKYL ETHERS

Haywood G. France, South Charleston, and Frederick E. Bailey, Jr., Charleston, W. Va., assignors to Union Carbide Corporation, a corporation of New York
No Drawing. Filed Apr. 13, 1959, Ser. No. 805,705
8 Claims. (Cl. 260—47)

This invention relates to a process for polymerizing terminal epoxyalkyl ether monomers and to the polymeric products resulting therefrom.

The polymerization of phenyl glycidyl ether in the presence of sodium hydroxide or potassium hydroxide as a catalyst therefor is disclosed in the literature[1]. The authors report that a brown polymer of low molecular weight is obtained by their procedure.

The present invention is directed to the process for polymerizing terminal epoxyalkyl ether monomers in contact with a catalytically significant quantity of an organometallic catalyst described hereinafter to produce useful polymers. A single terminal epoxyalkyl ether or an admixture of at least two different terminal epoxyalkyl ethers can be employed as the monomeric feed.

The terminal epoxyalkyl ethers which are contemplated in the instant invention are characterized by the following structural formula:

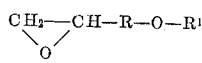

wherein R is a divalent saturated aliphatic hydrocarbon radical, preferably a lower divalent saturated hydrocarbon radical which contains from 1 to 4 carbon atoms, and preferably still R is methylene; and wherein $R^1$ is a haloaryl radical or a hydrocarbon radical, e.g., aryl, alkyl, alkaryl, aralkyl, alkenylaryl, and the like. Illustrative radicals for R include, for example, methylene, ethylene, propylene, butylene, 2-methylbutylene, hexylene, octylene, 2,4 - dimethyloctylene, 3 - propylheptylene, ethylidene, propylidene, hexylidene, octylidene, dodecylidene, and the like. Representative radicals for $R^1$ include, among others, phenyl, allylphenyl, 3-butenylphenyl, 2-,3-, and 4-methylphenyl, 2-, 3-, and 4-chlorophenyl, 2-, 3-, and 4-bromophenyl, 2-, 3-, and 4-iodophenyl, 4-isopropylphenyl, 4-tertiary butylphenyl, 4-n-octylphenyl, benzyl, phenethyl, phenylpropyl, ethyl, propyl, butyl, amyl, and the like. It is preferred that when $R^1$ contains a benzene nucleus, the sum total of the carbon atoms of the alkyl substituent(s), if any, attached to the benzene nucleus be less than 12.

Illustrative terminal epoxyalkyl ethers characterized by Formula I include, for instance, 2,3-epoxypropyl phenyl ether, 2,3-epoxypropyl 2-methylphenyl ether, 2,3-epoxypropyl 2-isopropylphenyl ether, 2,3-epoxypropyl 4-tertiary butylphenyl ether, 2,3-epoxypropyl 3-allylphenyl ether, 2,3-epoxypropyl 4-n-octylphenyl ether, 2,3-epoxypropyl o-(3-butenyl)-phenyl ether, 2,3-epoxypropyl 2-chlorophenyl ether, 2-3-epoxypropyl 3-chlorophenyl ether, 2-3-epoxypropyl 4-chlorophenyl ether, 2,3-epoxypropyl 2-chloro-4-methylphenyl ether, 2,3-epoxypropyl butyl ether, 2,3-epoxypropyl isoamyl ether, 3,4-epoxybutyl propyl ether, 3,4-epoxybutyl phenyl ether, 5,6-epoxyhexyl phenyl ether, 2,3-epoxypropyl phenethyl ether, 2,3-epoxypropyl benzyl ether, 3,4-epoxybutyl 3-amylphenyl ether, 5,6-epoxyhexyl 2,3-dibromophenyl ether, 5,6-epoxyhexyl 3-chlorophenyl ether, and the like.

The organometallic catalysts which can be employed in the polymerization reaction are characterized by the formula shown below:

II   $R_1—M—R_2$ wherein M is a group II metal of the periodic table, e.g., beryllium, magnesium, zinc, calcium, cadmium, strontium, and barium; and wherein $R_1$ and $R_2$ are hydrocarbon radicals free from ethylenic and acetylenic unsaturation, e.g., alkyl, aryl, aralkyl, alkaryl, and cycloalkyl. It is preferred that $R_1$ and $R_2$ contain from 1 to 10 carbon atoms. In addition, $R_2$ can be halogen such as chloride, bromine, iodine, and fluorine. Typical $R_1$ and $R_2$ radicals include, among others, methyl, ethyl, propyl, n-butyl, isobutyl, 2-ethylhexyl, dodecyl, octadecyl, phenyl, tolyl, xylyl, phenethyl, phenylpropyl, phenylbutyl, benzyl, cyclopentyl, cyclohexyl, cycloheptyl, 3-propylcyclohexyl, and the like. The dialkyl metals and diaryl metals are eminently suitable as catalysts for the novel process described herein. Dialkylzinc, diarylzinc, dialkylmagnesium, and alkylzinc halide are especially preferred catalyst subclasses.

Illustrative examples of organometallic catalysts that are contemplated include, for instance, diethylzinc, dipropylzinc, dibutylzinc, dioctadecylzinc, butylzinc chloride, butylzinc bromide, octylzinc chloride, diphenylzinc, di-o-tolylzinc, diethylmagnesium, dibutylmagnesium, di-n-octylmagnesium, diphenylmagnesium, ethylmagnesium iodide, diethylberyllium, di-n-butylberyllium, ethylberyllium chloride, diisoamylcadmium, dipropylcadmium, diethylcadmium, dicyclohexylzinc, and the like.

The organometallic catalyst is employed in catalytically significant quantities. In general, a catalyst concentration in the range of from about 0.01, and lower, to about 10 weight per cent, and higher, based on the weight of monomeric feed, is suitable. A catalyst concentration of from about 0.1 to about 3.0 weight percent, based on the weight of monomeric feed, is preferred. For optimum results, the particular organometallic catalyst employed, the nature of the terminal epoxyalkyl ether reagent, the operative temperature at which the polymerization reaction is conducted, the reaction rate desired, and other factors will largely determine the optimum catalyst concentration.

The polymerization reaction can be effected over a wide temperature range. The polymerization reaction can be effected at room temperature and at elevated temperatures. In general, a reaction temperature of from about 25° C., and lower, to about 150° C. is suitable. A reaction temperature in the range of from about 75° to 110° C. is preferred.

In general, the reaction time will vary depending on the operative temperature, the nature of the monomeric reagent employed, the particular catalyst and the concentration employed, the use of an inert organic diluent, and other factors. The reaction time can be as short as a few hours in duration, or shorter, or it can be as long as several days.

When polymerizing an admixture containing two different terminal epoxyalkyl ether monomers, the proportions of said monomers can vary over the entire range. Preferably the concentration of either monomeric terminal epoxyalkyl ether is in the range of from about 5 to about 95 weight percent, based on the total weight of said terminal epoxyalkyl ether monomers.

Preferably the polymerization reaction is conducted under an inert atmosphere, e.g., nitrogen. It is also desirable to effect the polymerization process under essentially anhydrous conditions.

The polymerization reaction can be carried out in the presence of an inert organic diluent such as, for example, aromatic hydrocarbons, e.g., benzene, toluene, xylene, ---
[1] K. Furukawa and R. Oda, Bull. Inst. Chem. Res., 30, 50 (1952); Jour. Chem. Soc. Japan, 55, 673 (1952).

ethylbenzene, chlorobenzene, and the like; various oxygenated organic compounds such as anisole, the dimethyl and diethyl ethers of ethylene glycol, of propylene glycol, of diethylene glycol and the like; normally liquid saturated hydrocarbons including the open chain, cyclic, and alkyl substituted cyclic saturated hydrocarbons such as pentane, hexane, heptane, various normally-liquid petroleum hydrocarbon fractions, cyclohexane, the alkylcyclohexanes, decahydronaphthalene, and the like.

Upon termination of the polymerization reaction, the crude reaction product can be substantially freed of unreacted epoxyalkyl ether monomer and catalyst residue by various convenient methods. For example, the reaction product can be dispersed in acetone which contains a mineral acid, e.g., hydrochloric acid, followed by filtering the resulting dispersion. The filter cake then can be washed, if desired, with small amounts of ethyl alcohol. Unreacted epoxyalkyl ether monomer and contained catalyst can be essentially removed from the crude reaction product by repeated washings, preferably at elevated temperatures, with an inert normally-liquid organic compound such as a lower aliphatic alcohol, e.g., methanol; aromatic hydrocarbons, e.g., benzene; and the like, which preferably contain a mineral acid. If desired, the resulting polymer product can be further washed with water to remove traces of acidic material, residues, and organic wash compound. In general, it is desirable to remove impurities, e.g., catalyst residue, etc., from the polymer product since the resulting purified polymer exhibits enhanced thermal and dimensional stability.

The polymers obtained by the practice of this invention are hard, tough solids which are insoluble in water and in many organic solvents at room temperature, such as for example, methanol, ethanol, diethyl ether, cyclohexanone, benzene, acetone, acetonitrile, ethyl acetate, chloroform, methylene chloride, carbon disulfide, toluene, xylene, and methyl ethyl ketone. These solid polymers are useful for the production of various shaped articles, e.g., buttons, brush handles, lamp bases, etc. The aryl epoxyalkyl ether polymers have excellent chemical resistivity and thermal stability which are particularly useful in the manufacture of molded articles and in the preparation of film material, e.g., in the manufacture of bags, wrapping material, and the like. Many of the polymers are extremely highly crystalline in nature and appear to be isotactic or syndyotactic polymers. For instance, poly(phenyl glycidyl ether) prepared in accordance with the process herein set forth is highly crystalline as determined by X-ray diffraction examination with sharp birefringence melting points as high as 194°–196° C., and higher. This crystalline polymer was extruded through a small orifice at 225° C. and was cold drawn or oriented by stretching as it was extruded through the orifice. The tensile modulus was in the range of from about 240,000 to above 500,000 p.s.i., and higher, depending upon the degree of fiber orientation. The polymer density was approximately 1.2, and slightly higher.

In the illustrative examples to follow, the term "reduced viscosity," wherever employed, is meant a value obtained by dividing the specific viscosity by the concentration of the polymer in the solution, the concentration being measured in grams of polymer per 100 milliliters of solvent at a given temperature, and is regarded as a measure of molecular weight. The specific viscosity is obtained by dividing the difference between the viscosity of the solution and the viscosity of the solvent by the viscosity of the solvent. The reduced viscosity value is determined at a concentration of 0.2 gram of polymer per 100 milliliters of solvent, i.e., benzene, at 30° C.

*Example 1*

Diphenylzinc was prepared by reacting diphenylmercury with zinc powder in the presence of copper powder catalyst. Diphenylzinc was solvent extracted from the reaction product by the use of highly purified hexane. The resulting suspension contained 0.0313 gram of diphenylzinc per milliliter of suspension. This method of preparation of diphenylzinc is well known in the art.[1]

To a clean tube previously flushed with nitrogen gas, there were added 4 milliliters of the above-prepared suspension (contained 0.125 gram of diphenylzinc). The hexane vehicle then was allowed to evaporate from the tube at room temperature and under reduced pressure. There remained in the tube while solid diphenylzinc. Distilled phenyl glycidyl ether (10.2 grams) was added to the tube which was subsequently sealed under a nitrogen atmosphere and placed in a 90° C. air circulating oven for a period of 24 hours. The tube was then removed from the oven and cooled to room temperature. The white solid product was ground in a Wiley mill, followed by slurrying the ground product in acetone and subjecting the resulting slurry to the action of a Waring Blendor. After this, the slurry was poured into 3 liters of ethanol, followed by filtration, and then washing the filter cake with ethanol. The filter cake was dried at 40°–45° C. in a vacuum oven under 30 mm. of Hg pressure for about 24 hours. The conversion of monomer to white, solid polymer was 98 percent. The polymer, i.e., poly(phenyl glycidyl ether) was crystalline and had a melting point of 194°–196° C.

*Example 2*

The apparatus employed in the following example was predried in a 110° C. circulating air oven and all operations were conducted under a blanket of high purity nitrogen gas. To a Pyrex tube, there were added 20 milliliters of a solution containing 40 weight percent phenyl glycidyl ether and 60 weight percent toluene, and 1.0 milliliter of dibutylmagnesium slurried in toluene (slurry contained 0.09 gram of dibutylmagnesium). The tube was then sealed and placed in a 90° C. air circulating oven for a period of 24 hours. The polymeric product was recovered by treating the crude reaction product with toluene, acetone and 3 cc. of 3N hydrochloric acid in a Waring Blendor. The resulting slurry was poured into 3 liters of ethanol (under agitation), followed by filtration, and then washing the filter cake with ethanol. The filter cake was dried in a vacuum oven under 30 mm. of Hg pressure for about 48 hours. The conversion of monomer to white, solid polymer was 45.6 percent. The poly(phenyl glycidyl ether) had a melting point of 194°–200° C.

In Examples 3 to 17 below, the procedure employed was as follows. The polymerization tubes, i.e., glass tubes of 10 milliliter capacity, were first flushed with nitrogen and then charged with appropriate monomer(s), catalyst, and diluent, if any. The tubes were then capped with a rubber policeman while still under a nitrogen atmosphere, and placed in a Dry Ice-acetone mixture. In this manner, a partial vacuum was created in the tube. The polymerization tubes were flame sealed and subsequently inserted into a thermostated aluminum block which was gently agitated for stated periods of time at 90° C. After this, the tubes were removed, cooled to room temperature, and broken open. The polymeric product was recovered by washing the crude reaction product with about 50 cc. of heptane and then drying under vacuum at about 50° C. for about 15 hours, or by recrystallization from about 50 cc. of hot 2-butoxyethanol, followed by drying under vacuum at 50° C. for a period of approximately 15 hours, as indicated. The melting point was determined on molded samples of the polymers using a bire-fringence melting point apparatus.

*Example 3*

To a Pyrex tube, there were charged para-octylphenyl glycidyl ether (3 grams) and dibutylzinc; the resulting admixture contained 5.0 weight percent dibutylzinc, based

[1] Ber. 63, 1138 (1934).

on the weight of para-octylphenyl glycidyl ether. The polymerization reaction was conducted for a period of 65 hours at 90° C., and the polymeric product was recovered via heptane washing as indicated previously. There was obtained a yellow solid. The yield was 57 percent. The polymeric product was insoluble in benzene, dimethylformamide, heptane, and acetonitrile; the polymeric product was soluble in refluxing 2-butoxyethanol.

*Example 4*

To a Pyrex tube, there were charged para-tolyl glycidyl ether (3 grams) and dibutylzinc; the resulting admixture contained 1.0 weight percent dibutylzinc, based on the weight of para-tolyl glycidyl ether. The polymerization reaction was conducted for a period of 17 hours at 90° C., and the polymeric product was recovered via the recrystallization technique using hot 2-butoxyethanol, as indicated previously. There was obtained a yellow, crystalline solid having a melting point of 200° C. The yield was 100 percent. The polymeric product was insoluble (at 24° C.) in benzene, dimethylformamide, heptane, and acetonitrile; the polymeric product was soluble in refluxing 2-butoxyethanol.

*Example 5*

To a Pyrex tube, there were charged para-tertiary butylphenyl glycidyl ether (3 grams) and dibutylzinc; the resulting admixture contained 3.0 weight percent dibutylzinc, based on the weight of para-tertiary butylphenyl glycidyl ether. The polymerization reaction was conducted for a period of 37 hours at 90° C., and the polymeric product was recovered via heptane washing as indicated previously. There was obtained a white solid. The yield was 48 percent. The polymeric product was insoluble (at 24° C.) in benzene, dimethylformamide, heptane, and acetonitrile; the polymeric product was soluble in refluxing 2-butoxyethanol.

*Example 6*

To a Pyrex tube, there were charged para-chlorophenyl glycidyl ether (3 grams) and dibutylzinc; the resulting admixture contained 0.5 weight percent dibutylzinc, based on the weight of para-chlorophenyl glycidyl ether. The polymerization reaction was conducted for a period of 99 hours at 90° C., and the polymeric product was recovered via the recrystallization technique using hot 2-butoxyethanol, as indicated previously. There was obtained a white, crystalline solid which had a melting point of 162° C. The yield was 85 percent. The polymeric product was insoluble (at 24° C.) in benzene, dimethylformamide, heptane, and acetonitrile; the polymeric product was soluble in refluxing 2-butoxyethanol.

*Example 7*

To a Pyrex tube, there were charged meta-tolyl glycidyl ether (3 grams) and dibutylzinc; the resulting admixture contained 0.5 weight percent dibutylzinc, based on the weight of meta-tolyl glycidyl ether. The polymerization reaction was conducted for a period of 183 hours at 90° C., and the polymeric product was recovered via heptane washing as indicated previously. There was obtained a white solid. The yield was 70 percent. The polymeric product was insoluble (at 24° C.) in benzene, dimethylformamide, heptane, and acetonitrile; the polymeric product was soluble in refluxing 2-butoxyethanol.

*Example 8*

To a Pyrex tube, there were charged ortho-tolyl glycidyl ether (3 grams) and dibutylzinc; the resulting admixture contained 0.5 weight percent dibutylzinc, based on the weight of ortho-tolyl glycidyl ether. The polymerization reaction was conducted for a period of 23 hours at 90° C., and the polymeric product was recovered via the recrystallization technique using hot 2-butoxyethanol, as indicated previously. There was obtained a white, crystalline solid having a melting point of 190° C. The yield was 33 percent. The polymeric product was insoluble (at 24° C.) in benzene, dimethylformamide, heptane, and acetonitrile; the polymeric product was soluble in refluxing 2-butoxyethanol.

*Example 9*

To a Pyrex tube, there were charged ortho-tolyl glycidyl ether (3 grams) and a solution of diethylmagnesium in diethyl ether (solution contained 0.03 gram of magnesium per milliliter of diethyl ether vehicle). The resulting admixture contained 0.3 weight percent magnesium (calculated as the metal), based on the weight of ortho-tolyl glycidyl ether. The polymerization reaction was conducted for a period of 17 hours at 90° C., and the polymeric product was recovered via heptane washing as indicated previously. There was obtained a white solid. The yield was 67 percent. The polymeric product was insoluble (at 24° C.) in benzene, dimethylformamide, heptane, and acetonitrile; the polymeric product was soluble in refluxing 2-butoxyethanol.

*Example 10*

To a Pyrex tube, there were charged ortho-chlorophenyl glycidyl ether (3 grams) and a solution of diethylmagnesium in diethyl ether (solution contained 0.03 gram of magnesium per milliliter of diethyl ether vehicle). The resulting admixture contained 0.7 weight percent magnesium (calculated as the metal), based on the weight of ortho-chlorophenyl glycidyl ether. The polymerization reaction was conducted for a period of 17 hours at 90° C., and the polymeric product was recovered via heptane washing as indicated previously. There was obtained a tan, crystalline solid having a melting point of 189° C. The yield was 93 percent. The polymeric product was insoluble (at 24° C.) in benzene, dimethylformamide, heptane, and acetonitrile; the polymeric product was soluble in refluxing 2-butoxyethanol.

*Example 11*

To a Pyrex tube, there were charged para-octylphenyl glycidyl ether (3 grams) and a solution of diethylmagnesium in diethyl ether (solution contained 0.03 gram of magnesium per milliliter of diethyl ether vehicle). The resulting admixture contained 1.0 weight percent magnesium (calculated as the metal), based on the weight of para-octylphenyl glycidyl ether. The polymerization reaction was conducted for a period of 17 hours at 90° C., and the polymeric product was recovered via heptane washing as indicated previously. There was obtained a yellow solid. The yield was 91 percent. The polymeric product was insoluble (at 24° C.) in benzene, dimethylformamide, heptane, and acetonitrile; the polymeric product was soluble in refluxing 2-butoxyethanol.

*Example 12*

To a Pyrex tube, there were charged phenyl glycidyl ether (2.4 grams), ortho-tolyl glycidyl ether (0.6 gram), and an amount of dibutylzinc such that the resulting admixture contained 0.7 weight percent dibutylzinc, based on the total weight of monomers. The polymerization reaction was conducted for a period of 17 hours at 90° C., and the polymeric product was recovered via heptane washing as indicated previously. There was obtained a tan solid. The yield was 100 percent. The polymeric product was insoluble (at 24° C.) in benzene, dimethylformamide, heptane, and acetonitrile; the polymeric product was soluble in refluxing 2-butoxyethanol.

*Example 13*

To a Pyrex tube, there were charged phenyl glycidyl ether (1.8 grams), ortho-chlorophenyl glycidyl ether (1.2 grams) and an amount of dibutylzinc such that the resulting admixture contained 0.7 weight percent dibutylzinc, based on the total weight of monomers. The polymerization reaction was conducted for a period of 17 hours at 90° C., and the polymeric product was recovered via heptane washing as indicated previously. There was obtained a solid copolymer in a yield of 100 percent. The molded sample of this copolymer had a melting point of 165° C. The polymeric product was insoluble (at 24° C.) in benzene, dimethylformamide, heptane, and acetonitrile; the polymeric product was soluble in refluxing 2-butoxyethanol.

*Example 14*

To a small glass tube, there were charged 10 grams of phenyl glycidyl ether and 0.17 gram of dibutylzinc. The glass tube then was sealed under a slight vacuum and inserted into a thermostated aluminum block which was gently agitated for a period of 24 hours at 90° C. The polymeric product was recovered via heptane washing as indicated previously. The conversion of monomer to polymer was essentially quantitative; nine grams of solid polymer were obtained. This polymer, i.e., poly(phenyl glycidyl ether), was insoluble, at approximately 24° C., in water, acetonitrile, methanol, cyclohexanone, benzene, acetone, and dimethylformamide. It was partially soluble in hot dimethylformamide.

A sample of the poly(phenyl glycidyl ether) product was extracted in a Soxhlet extractor with 2-butoxyethanol. Only 30 weight percent of this sample was extracted. The unextracted portion was shown to be highly crystalline by X-ray diffraction examination and to have a sharp bire-fringence melting point of 182°–184° C. The crystalline poly(phenyl glycidyl ether) was extruded through a small orifice at 225° C. A drawn and oriented extruded mono-filament exhibited a bire-fringence melting point of 194°–196° C.

*Example 15*

To a small glass tube, there were charged 5 grams of phenyl glycidyl ether and 0.075 gram of dibutylzinc. The glass tube then was sealed under a slight vacuum and inserted into a thermostated aluminum block which was gently agitated for a period of 68 hours at 90° C. The polymeric product was recovered via heptane washing as indicated previously. A 60 percent yield of highly crystalline poly(phenyl glycidyl ether) was obtained. The properties of the polymer were very similar to those properties exhibited by the polymer obtained in Example 14.

In an analogous manner as above, 4,5-epoxypentyl amyl ether and 3,4-epoxybutyl isohexyl ether can be homopolymerized in the presence of a catalytic quantity of butylzinc chloride or dipropylberyllium, under the operative conditions noted above, to give a hard, solid polymer.

*Example 16*

To a small glass tube, there were charged 5 grams of phenyl glycidyl ether and 0.1 gram of dibutylzinc. The polymerization was conducted for a period of 118.5 hours at 90° C., and the polymeric product was recovered via heptane washing as indicated previously. There was obtained a brown solid which gave a bire-fringence melting point of 190° C. The yield was 100 percent. The polymeric product was insoluble in hot benzene, ethylene dichloride, methanol, and dimethyl ether; this product was soluble in hot 2-butoxy-ethanol.

*Example 17*

To a small glass tube, there were charged 5 grams of ortho-allylphenyl glycidyl ether and 0.1 gram of dibutylzinc. The polymerization reaction was conducted for a period of 18 hours at 90° C., and the polymeric product was recovered via heptane washing as indicated previously. There was obtained a brown solid. The yield was 100 percent. This polymer was soluble in benzene and ethylene dichloride and had a reduced viscosity in benzene of 1.26.

*Example 18*

To a small glass tube, there were charged 3 grams of butyl glycidyl ether and 0.1 gram of diethylmagnesium. The polymerization reaction was conducted for a period of 144 hours at 90° C. After this period of time, the tube was broken open and the excess monomer was removed by drying under vacuum (1–2 mm. of Hg) at room temperature for 16 hours. There was obtained 1 gram of a yellow sticky solid having a reduced viscosity in benzene of 1.37.

Although the invention has been illustrated by the preceding examples, the invention is not to be construed as limited to the materials employed in the above exemplary examples, but rather, the invention encompasses the generic area as hereinbefore disclosed. Various modifications and embodiments of this invention can be made without departing from the spirit and scope thereof.

What is claimed is:

1. A process for the production of a crystalline polymer having a melting point of at least 162° C. which comprises contacting a mono-vicinal epoxy containing compound selected from the group consisting of phenyl glycidyl ether, chlorophenyl glycidyl ether, tolyl glycidyl ether, and mixtures thereof; with from about 0.01 to about 10 weight percent, based on the total weight of said mono-vicinal epoxy containing compound, of an organometallic catalyst having the formula:

$$R_1—M—R_2$$

wherein $R_1$ is a hydrocarbon radical free from ethylenic and acetylenic unsaturation, wherein $R_2$ is a member selected from the group consisting of halogen and a hydrocarbon radical free from ethylenic and acetylenic unsaturation, and wherein M is a metal selected from the group consisting of beryllium, magnesium, zinc, calcium, strontium, and barium; at a temperature in the range of from about 25° C. to about 150° C.; the polymerization reaction being effected through the mono-vicinal epoxy group of said mono-vicinal epoxy containing compound.

2. The process of claim 1 wherein said organometallic catalyst is dialkylzinc.

3. The process of claim 1 wherein said organometallic catalyst is dialkylmagnesium.

4. The process of claim 2 wherein said mono-vicinal epoxy containing compound is phenyl glycidyl ether.

5. The process of claim 2 wherein said mono-vicinal epoxy containing compound is chlorophenyl glycidyl ether.

6. The process of claim 2 wherein said mono-vicinal epoxy containing compound is tolyl glycidyl ether.

7. The process of claim 2 wherein said mono-vicinal epoxy containing compound is an admixture of chlorophenyl glycidyl ether and phenyl glycidyl ether.

8. The process of claim 4 wherein said organometallic catalyst is dibutylzinc.

References Cited in the file of this patent

UNITED STATES PATENTS 2,870,100     Stewart et al. _____ Jan. 20, 1959

FOREIGN PATENTS 477,843     Great Britain _____ Jan. 3, 1938